(12) United States Patent
Lokken

(10) Patent No.: US 11,608,625 B1
(45) Date of Patent: Mar. 21, 2023

(54) JOINT CONNECTOR

(71) Applicant: Peter Lokken, Brooklyn, NY (US)

(72) Inventor: Peter Lokken, Brooklyn, NY (US)

( * ) Notice: Subject to any disclaimer, the term of this patent is extended or adjusted under 35 U.S.C. 154(b) by 500 days.

(21) Appl. No.: 16/816,645

(22) Filed: Mar. 12, 2020

(51) Int. Cl.
*E04B 1/19* (2006.01)
*E04B 1/32* (2006.01)
*F16B 7/18* (2006.01)

(52) U.S. Cl.
CPC .............. *E04B 1/1909* (2013.01); *E04B 1/32* (2013.01); *F16B 7/18* (2013.01); *E04B 2001/199* (2013.01); *E04B 2001/1921* (2013.01); *E04B 2001/1963* (2013.01); *E04B 2001/1987* (2013.01); *E04B 2001/3223* (2013.01); *E04B 2001/3247* (2013.01)

(58) Field of Classification Search
CPC ..... E04B 2001/3235; E04B 2001/3241; E04B 2001/3247; E04B 2001/3223; E04B 2001/1915; E04B 2001/1918; E04B 2001/1957; E04B 2001/1921; E04B 2001/1963; E04B 2001/199; E04B 2001/1981; E04B 2001/1984; E04B 2001/1987; E04B 1/32; E04B 1/1909; E04B 1/1912
See application file for complete search history.

(56) References Cited

U.S. PATENT DOCUMENTS

| | | | | |
|---|---|---|---|---|
| 4,449,843 A | * | 5/1984 | Wendel | E04B 1/1903 52/81.3 |
| 4,904,108 A | * | 2/1990 | Wendel | E04B 1/1912 403/356 |
| 5,148,648 A | * | 9/1992 | Sorenson | E04B 1/1903 403/328 |
| 6,205,739 B1 | * | 3/2001 | Newlin | E04B 1/19 52/645 |
| 6,286,282 B1 | * | 9/2001 | Castano | E04B 1/3211 403/171 |
| 6,378,265 B1 | * | 4/2002 | Konstandt | E04B 1/1903 403/171 |
| 7,143,550 B1 | * | 12/2006 | Lopez | E04B 1/3205 52/81.3 |
| 7,481,235 B2 | * | 1/2009 | Prusmack | E04H 15/18 135/147 |
| 8,739,492 B2 | * | 6/2014 | Hawkins | E04B 1/1909 52/655.1 |
| 2010/0139192 A1 | * | 6/2010 | Ng | E04B 1/32 52/646 |

FOREIGN PATENT DOCUMENTS

| | | | | |
|---|---|---|---|---|
| EP | 566519 A1 | * | 10/1993 | ........... E04B 1/1903 |
| WO | WO-2016071935 A1 | * | 5/2016 | ........... E04B 1/1906 |

* cited by examiner

*Primary Examiner* — Jessica L Laux
(74) *Attorney, Agent, or Firm* — Stadler IP Law PLLC

(57) ABSTRACT

A joint connector comprising a hub, two registration caps, a bolt assembly or similar means of connecting the components, and at least two wing pairs. The joint connector is adaptable and thus is capable of creating a variety of different joint networks. Joint connectors can be arranged to connect panel frames and panels for regularly faceted structures and asymmetrical or irregularly shaped structures.

6 Claims, 18 Drawing Sheets

JOINT CONNECTOR

FIELD OF INVENTION

This invention relates to a joint connector, more particularly, this invention is directed to a joint connector that can be used to create a variety of joint networks.

BACKGROUND OF INVENTION

Many buildings and structures require joint connectors to join or attach flat panels. In the assembly of regularly faceted structures such as domes, awnings, roofs, or curtain walls, the joint connection is fairly straightforward. Many of the joint connectors are identical and can be mass-produced.

In contrast, when the building or structure is an asymmetrical or irregular shape, the joint connection can get rather complicated, thereby requiring joint connectors that are unique from one another and that cannot be mass-produced. As such, asymmetrical or irregularly shaped buildings or structures may be cost-prohibitive.

Thus, it would be desirable for a joint connector that allows for the creation of a variety of different joint networks for the building and assembly of any irregularly shaped building or structure.

SUMMARY OF THE INVENTION

Accordingly, it is the subject of this invention to provide a joint connector that is capable of creating a variety of different joint networks.

A joint connector comprising a hub, two registration caps, a bolt assembly or similar means of connecting the components, and at least two wing pairs.

Figure 1:
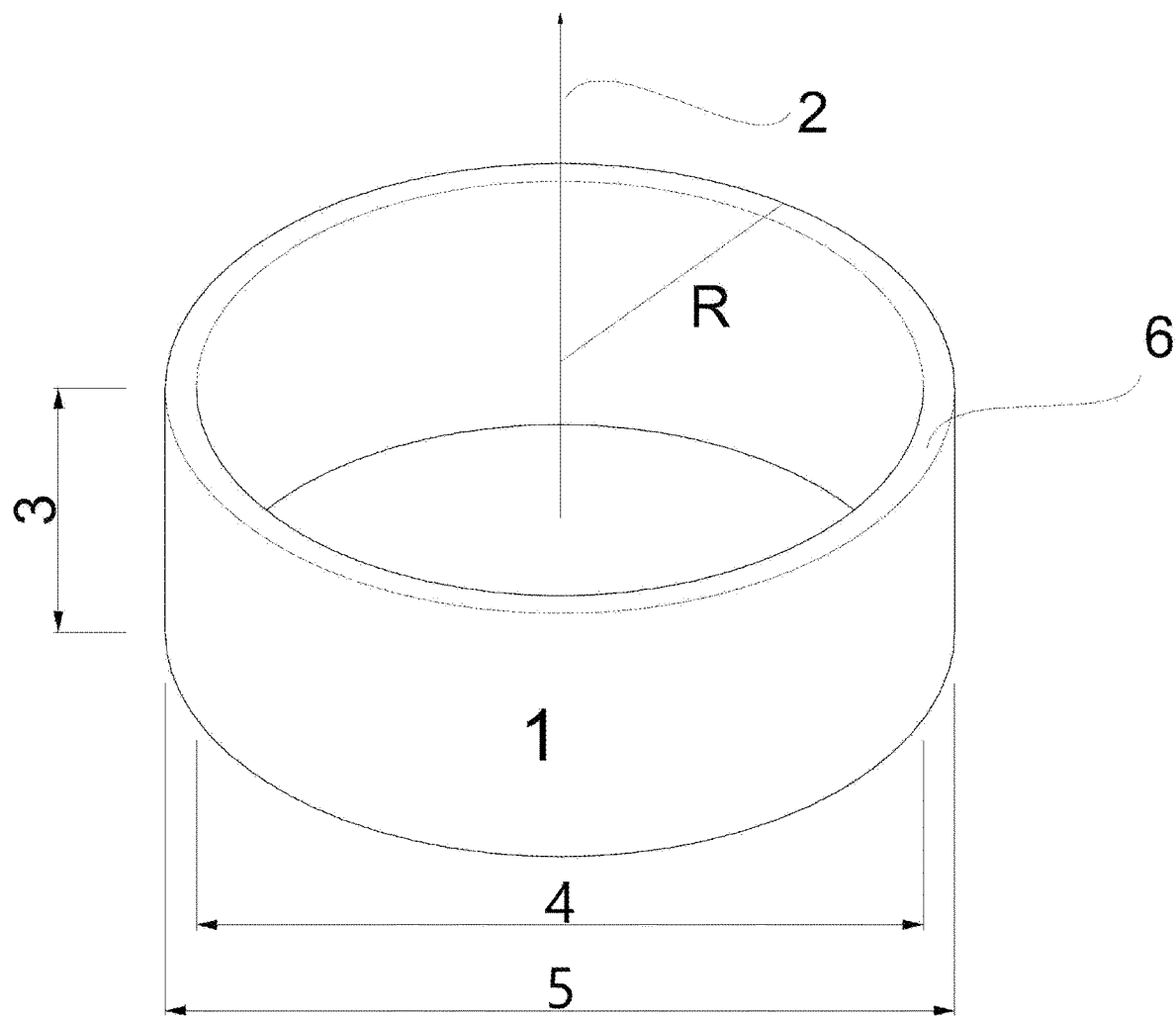
FIG. 1 depicts a hub of the joint connector.

DETAILED DESCRIPTION OF THE INVENTION
Components list

Hub - 1
Longitudinal vector - 2
Height of hub - 3
Inner diameter of hub - 4
Outer diameter of hub - 5
Gauge of hub - 6
Radius of hub - R
Wing pair - 8
Upper wing - 9
Lower wing - 10
Rectangular slot - 11
Width of rectangular slot - 12
Wing wrap-around width - 13
Depth of rectangular slot - 14
Hub connection area - 15
Transition area - 16
Side - 17
Shoulder - 18
Protrusion - 19
Seating width of strut that sleeves onto protrusion - 20
Width of protrusion - 21
Hole - 22
Angle of protrusion - 23
Mating hole - 25
Tab - 26
Perforation line - 27
Hole - 28
Length of tab - 29
Width of tab - 30
Distance of tab hole - 31
Depth of upper and lower wings - 33
Strut - 36
Outer diameter (OD) of strut - 37
Inner diameter (ID) of strut - 38
Longitudinal vector of strut - 39
Gauge of strut - 40
Length of strut - 41
Hole - 45
Diameter of hole - 46
Top registration cap - 50
Bottom registration cap - 51
Diameter of registration cap - 52
Rectangular slot - 53
Width of rectangular slot - 54
Length of rectangular slot - 55
Radial centerline for top registration cap - 56
Radial centerline for bottom registration cap - 57
Registration cap pair - 58
Hole - 59
Diameter of hole - 60
Bolt - 61
Nut - 62
Washer - 63
Angle between rectangular slots - 64
Bolt Assembly - 67
Registration cap gauge - 68
Modified hub - 70
Modified registration cap pair 73
Anchoring hole - 74
Panel frame - 80
Panel frame hole - 81
Panel - 85
Substructure - 90
Joint connector - 100

A joint connector 100 is disclosed. Each joint connector 100 is comprised of a hub 1, a registration cap pair 58, a bolt assembly 67, and at least two wing pairs 8. In one embodiment, the bolt assembly 67 further comprises a structural steel bolt 61, two washers 63, a split washer 63, and a nut 62. In another embodiment, the joint connector 100 is connected without a bolt assembly 67. For example, the joint connector 100 may be welded or connected by some other means.

Turning to FIG. 1, a hub 1 of the joint connector 100 is depicted, wherein the hub 1 has a longitudinal vector 2 that is the z-axis of the joint connector 100. In one embodiment, the hub 1 is made of metal, while in other embodiments, it is made of anything that is structurally strong enough to support the joint of a building or other structure. Hub 1 also includes height 3, inner diameter (ID) 4, and outer diameter (OD) 5. The difference between the OD 5 and ID 4 is gauge 6 of hub 1. One-half of the OD 5 is the radius R of Hub 1.

Figure 2A:
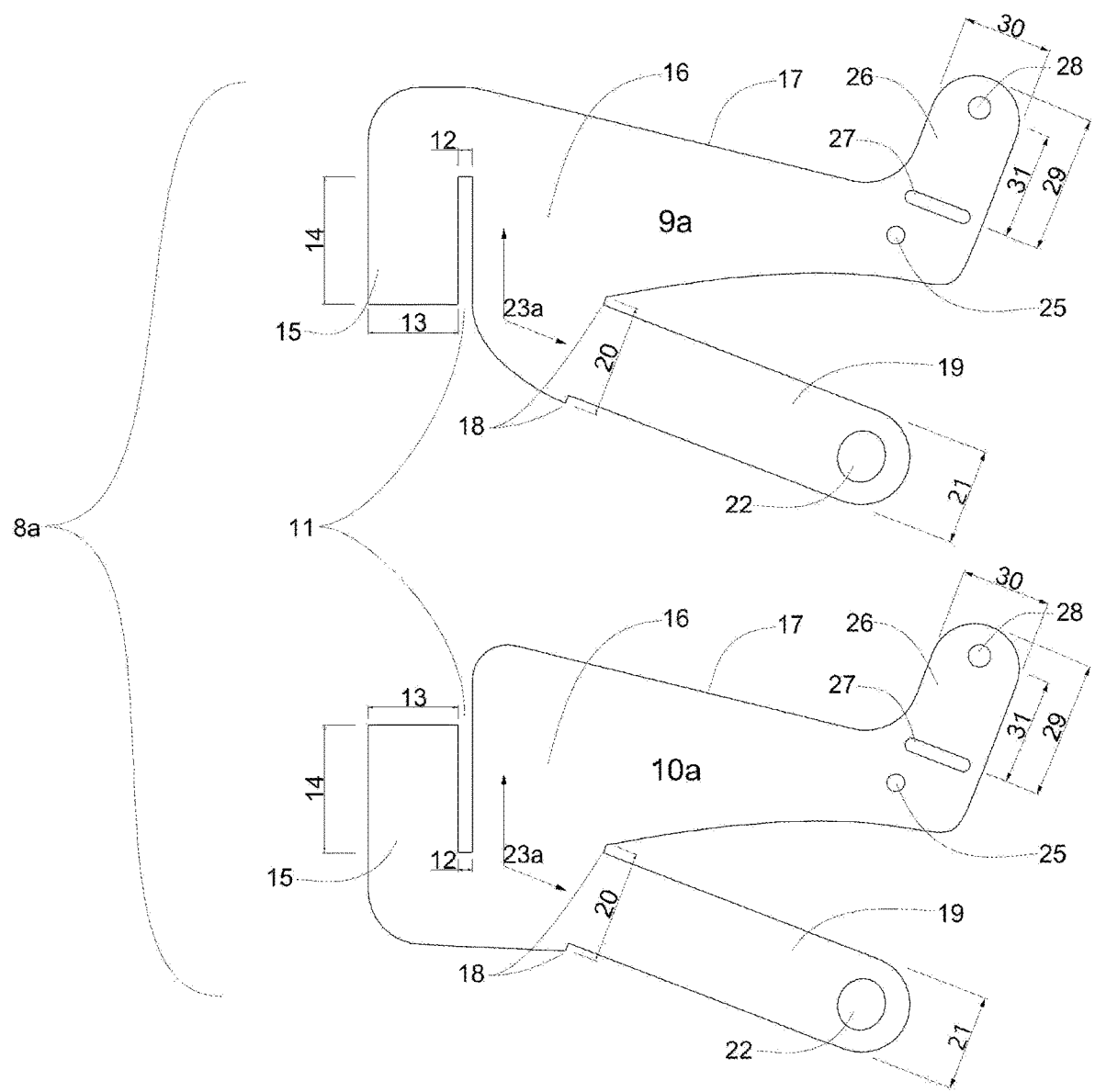
FIG. 2a depicts a wing pair of the joint connector.

FIG. 2a depicts an example of corresponding wings, upper wing 9a and lower wing 10a, which together form a wing pair 8a. Upper wing 9a and lower wing 10a may be made from sheet stock metal whose general size and gauge depend on the structural analysis of the overall structure shape. Upper and lower wings 9a, 10a, may also be made from any suitable material. Upper and lower wings 9a, 10a, of wing pair 8a will both have a rectangular slot 11 which represents the same vector as the vertical orientation 2 of hub 1 described above.

Rectangular slot 11 has width 12 and depth 14. Width 12 will correspond to hub gauge 6 such that the wing pair 8 fits snuggly around hub 1. The material or hub connection area 15 that wraps around rectangular slot 11 has width 13. Rectangular slot 11 is the attachment point between the upper wing 9a and lower wing 10a and hub 1, such that hub connection area 15 will be seated inside hub 1 and the rest of upper wing 9 and lower wing 10 will remain outside hub 1. Upper wing 9a will slot in from the top and lower wing 10a will slot in from the bottom. Upper and lower wings 9a, 10a, have mating holes 25 to accommodate a bolt assembly 67 (FIG. 6a) that allow the upper and lower wings 9a, 10a, to be aligned and connected. In another embodiment, bolt assembly 67 may be a plug weld or any other suitable connector that joins the wing pair 8 to itself.

Transition area 16 connects the three functional aspects of the wing: the hub connection area 15 that slots onto hub 1, the area or protrusion 19 that sleeves strut 36 and the area or tab 26 that grabs the panel frame 80. Transition area 16 represents a trifurcation in the upper and lower wings 9a, 10a, which connects the hub 1 via hub connection area 15 to the two functional aspects of the structure: the substructure (joint connectors and struts) and superstructure (panel frame). In the lower portion of upper and lower wings 9a, 10a, there is protrusion 19. The angle of protrusion 19 relative to rectangular slot 11 is shown by angle 23 and may be particular to each wing pair 8.

The struts 36 described below will sleeve onto protrusion 19 up to shoulder 18. The ID 38 of the struts 36 will correspond to the width 21 of protrusion 19 and the OD 37 of struts 36 correspond to the width 20 of seating shoulders 18.

Hole 22 near the end of protrusion 19 attaches the wing pair 8 to strut 36 via bolt assembly 67.

The upper portion of upper and lower 9a, 10a, running along side 17 will lead to tab 26. Tab 26 is folded along perforation line 27 in order to accommodate the glazing panel frame 80, described later. Tab 26 has length 29 and width 30. Hole 28 is centered along width 30 of tab 26 and distance 31 away from perforation line 27. Hole 28 attaches the joint connector 100 to the glazing plane frame 80 (described below).

Figure 2B:
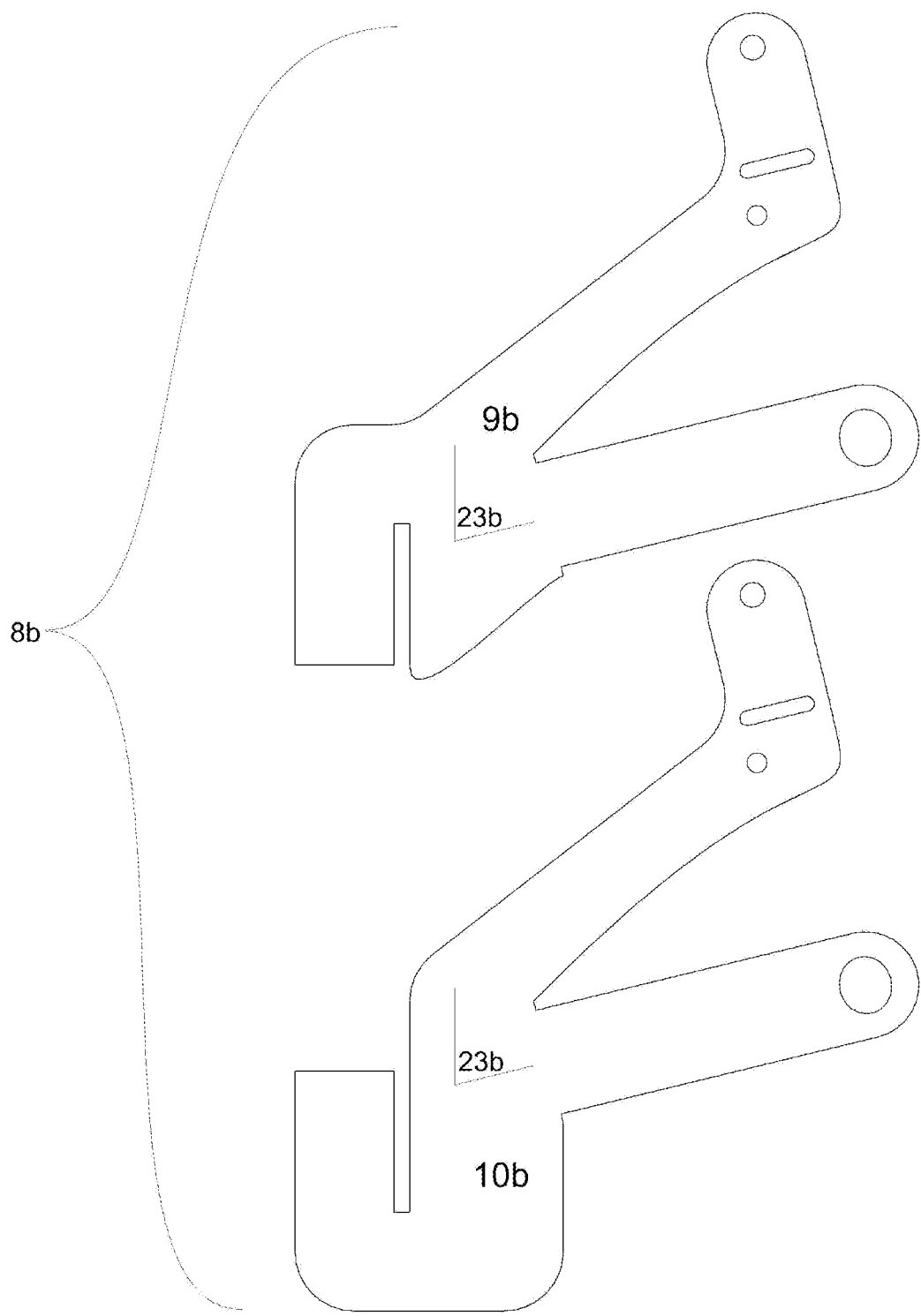
FIG. 2b depicts a wing pair of the joint connector.

FIG. 2b depicts another wing pair 8b, having first wing 9b and second wing 10b, with a different angle of protrusion 23b.

Figure 3:
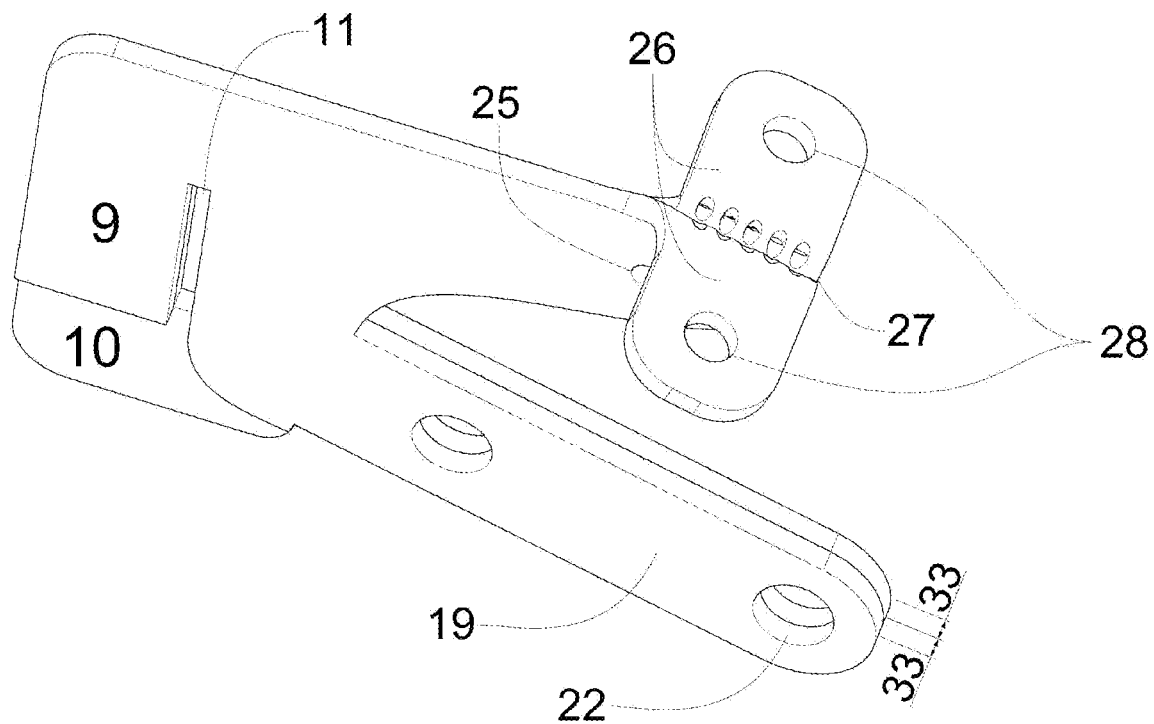
FIG. 3 depicts a perspective view of a mated wing pair of the joint connector.

FIG. 3 shows wing pair 8 mated together where mating holes 25 align, and tabs 26 are folded at their perforation lines 27. Upper wing 9 and lower wing 10 both have depth 33.

Figure 4:
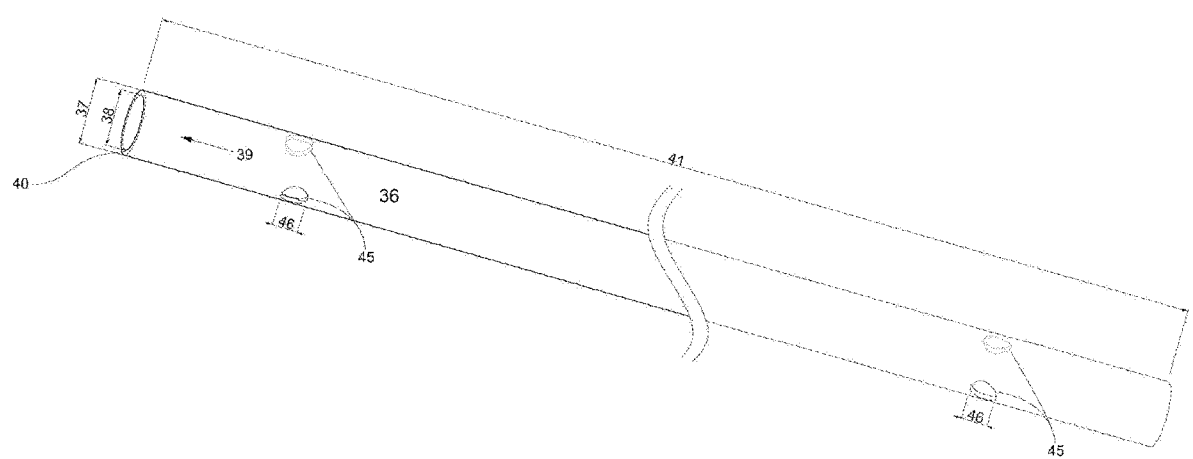
FIG. 4 depicts a substructure strut having holes to accommodate attachment to a wing pair via a bolt assembly.

FIG. 4 shows a strut 36 which will connect two wing pairs 8, from two neighboring joint connectors (not shown). The angle of protrusion 23 of the wing pairs 8 will orient longitudinal vector 39 of strut 36 coincidentally. The strut 36 will sleeve up to shoulder 18 and connect to the wing pair 8 via a bolt assembly 67 through holes 45 in strut 36 and the hole 22 in the wing pair 8 described above. The width 21 of protrusion 19 corresponds to strut ID 38 such that strut 36 will snuggly sleeve over protrusion 19 of wing pair 8 up to shoulder 18. The OD 37 of strut 36 will correspond to width 20 of wing pair 8. The length 41 of strut 36 is dependent on how neighboring joint connectors will be assembled to yield a functioning structure. The strut has gauge 40. Hole 45 has diameter 46.

Figure 5A:
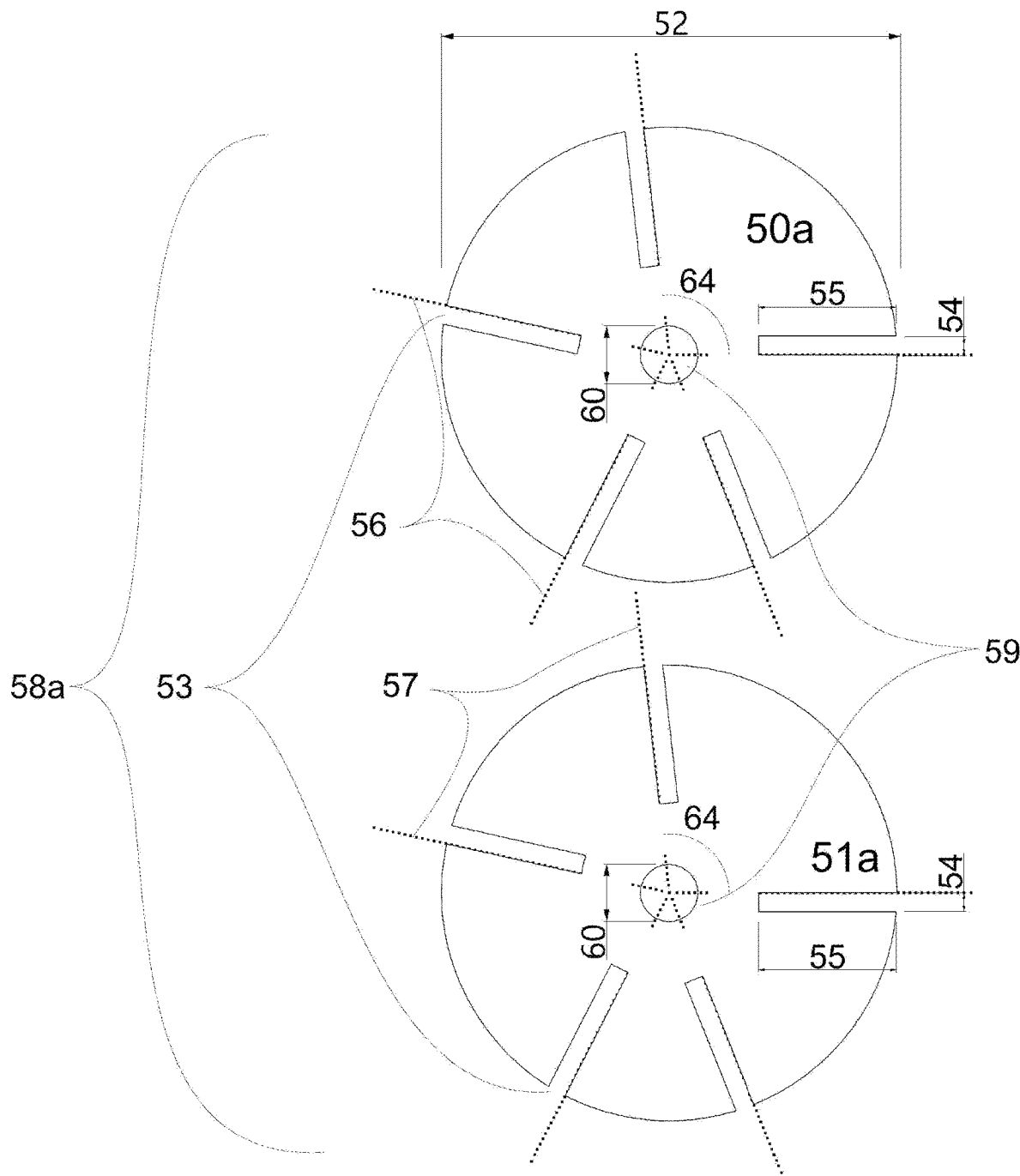
FIG. 5a depicts a registration cap pair of the joint connector.

The joint connector 100 also consists of two flat round pieces including top registration cap 50 and bottom registration cap 51 an example of which is shown by 50a and 51a in FIG. 5a. Like the upper and lower wings 9, 10, top and bottom registration caps 50a and 51a are matching pairs, one of the top or bottom registration caps 50a, 51a, is inserted on either end of hub 1 such that the hub's rim and the top or bottom registration cap 50a or 51a are flush. The diameter 52 of top and bottom registration caps 50a, 51a correspond to the ID 4 of hub 1.

Top and bottom registration caps 50a and 51a have a plurality of rectangular slots 53 cut into them, wherein the rectangular slots 53 radiate from the center. Rectangular slots 53 have length 55 that corresponds to the size of the upper and lower wings 9, 10 wing wrap-around gauge 13. The rectangular slots 53 have width 54 that corresponds to the width of the wings 33. Thus, similar to how the struts 36 snuggly fit onto the wing protrusions 19, described above, the upper and lower wings 9, 10, will snuggly seat into the top and bottom registration caps 50a, 51a. The orientations of the rectangular slots 53 are adjusted to orient each wing pair 8 relative to its neighbor. There is a concentric hole 59 in the middle of each top and bottom registration cap 50, 51, such that a bolt assembly 67 can be inserted through the bottom registration cap 51, the hub 1, and the top registration cap 50 and be tightened to hold the hub 1, top and bottom registration caps 50, 51, and upper and lower wings 9, 10, together as one closed entity. Hole 59 has diameter 60.

The only difference between 50a and 50b is a shift in the orientation of rectangular slots 53. Radial centerline for top registration cap 56 of rectangular slot 53 are shown by dotted lines radiating from the center of the top registration cap 56a. Radial centerline 57 for bottom registration cap 51a of rectangular slot 53 are shown by dotted lines radiating from the center of the bottom registration cap 51a. This is done so that when the wing pairs 8 are mated in the matching registration cap pairs 58 their seam radiates perfectly from the center of the joint connector 100, and thus it is assured that the protrusion 19 of the wing pair 8 points directly at its neighboring joint connector 100. There will be at least two rectangular slots 53 in each registration cap pair 58. Each pair of rectangular slots 53 in a registration cap pair 58 will be rotated about the center relative to an angle 64. In another embodiment, the number of rectangular slots 53 may be greater than two and in some embodiments there may be 20 rectangular slots 53.

Figure 5B:
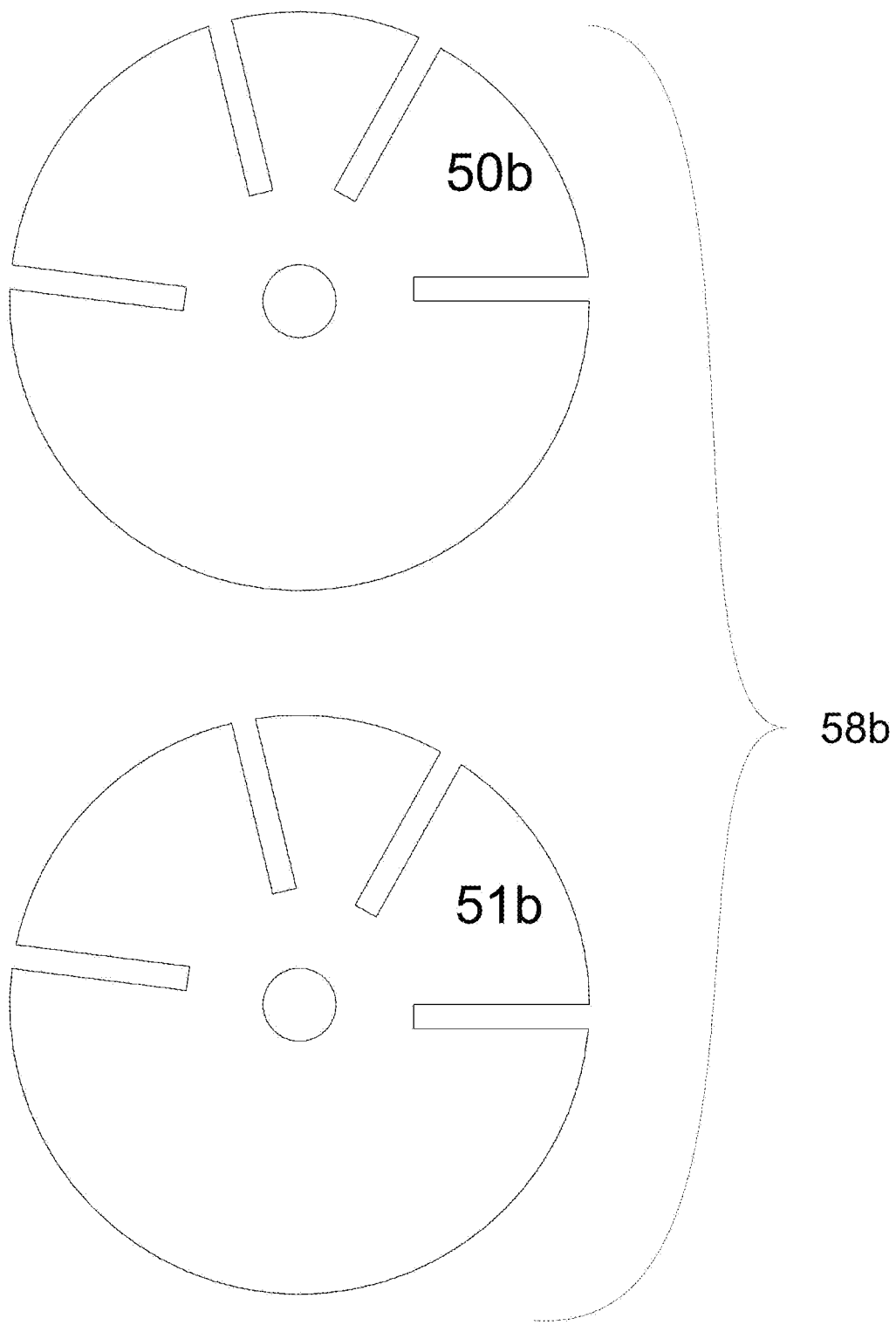
FIG. 5b depicts a registration cap pair of the joint connector.

FIG. 5b shows a different registration cap pair 58 with different rectangular slot 53 arrangements, corresponding to the needs of the joint connector 100 to orient itself to align with its neighbors. Registration cap pairs 58 have gauge 68 as shown in FIG. 6a.

Figure 6A:
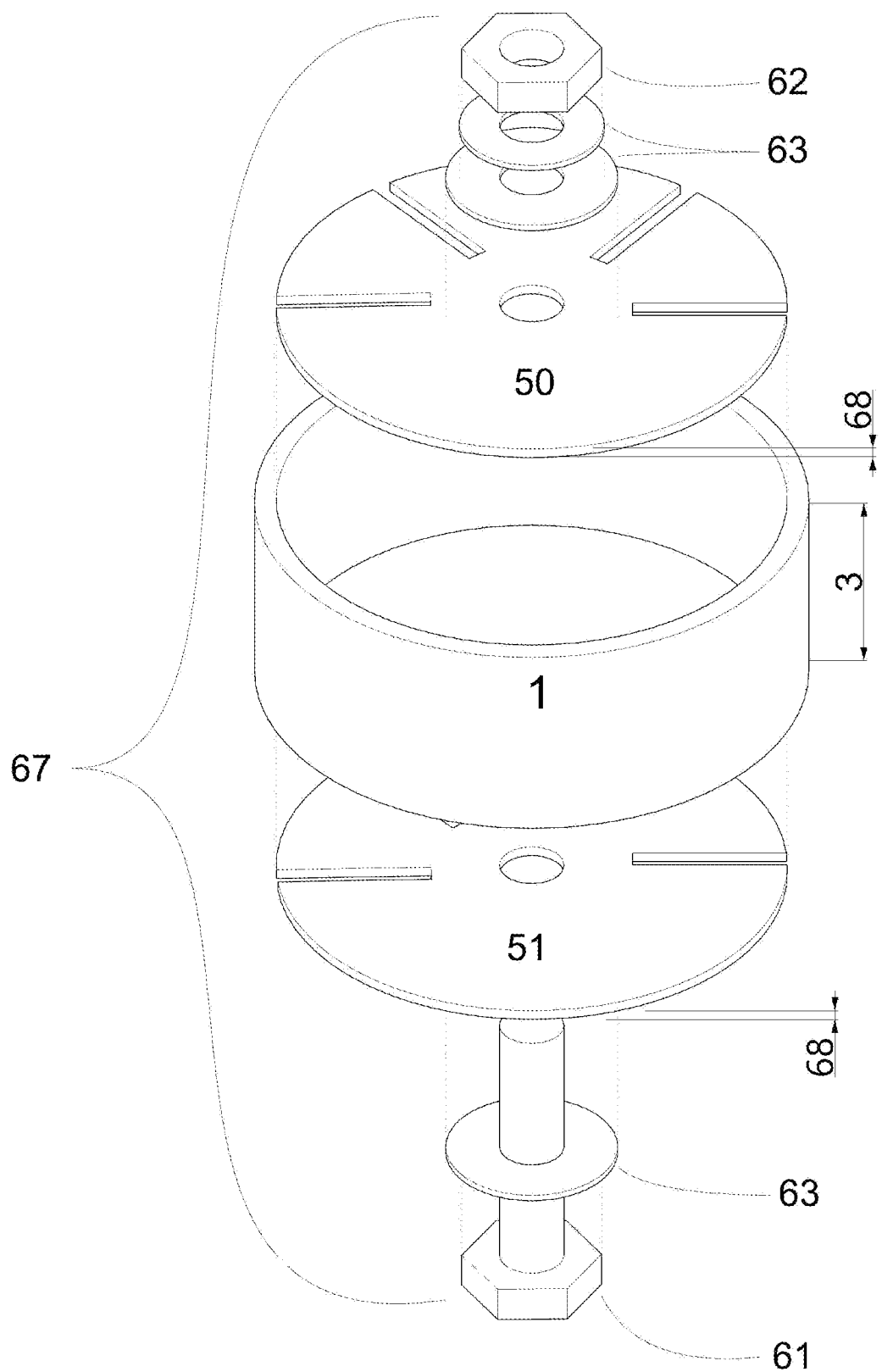
FIG. 6a is an exploded view of a hub, registration caps, and bolt assembly together.
Figure 6B:
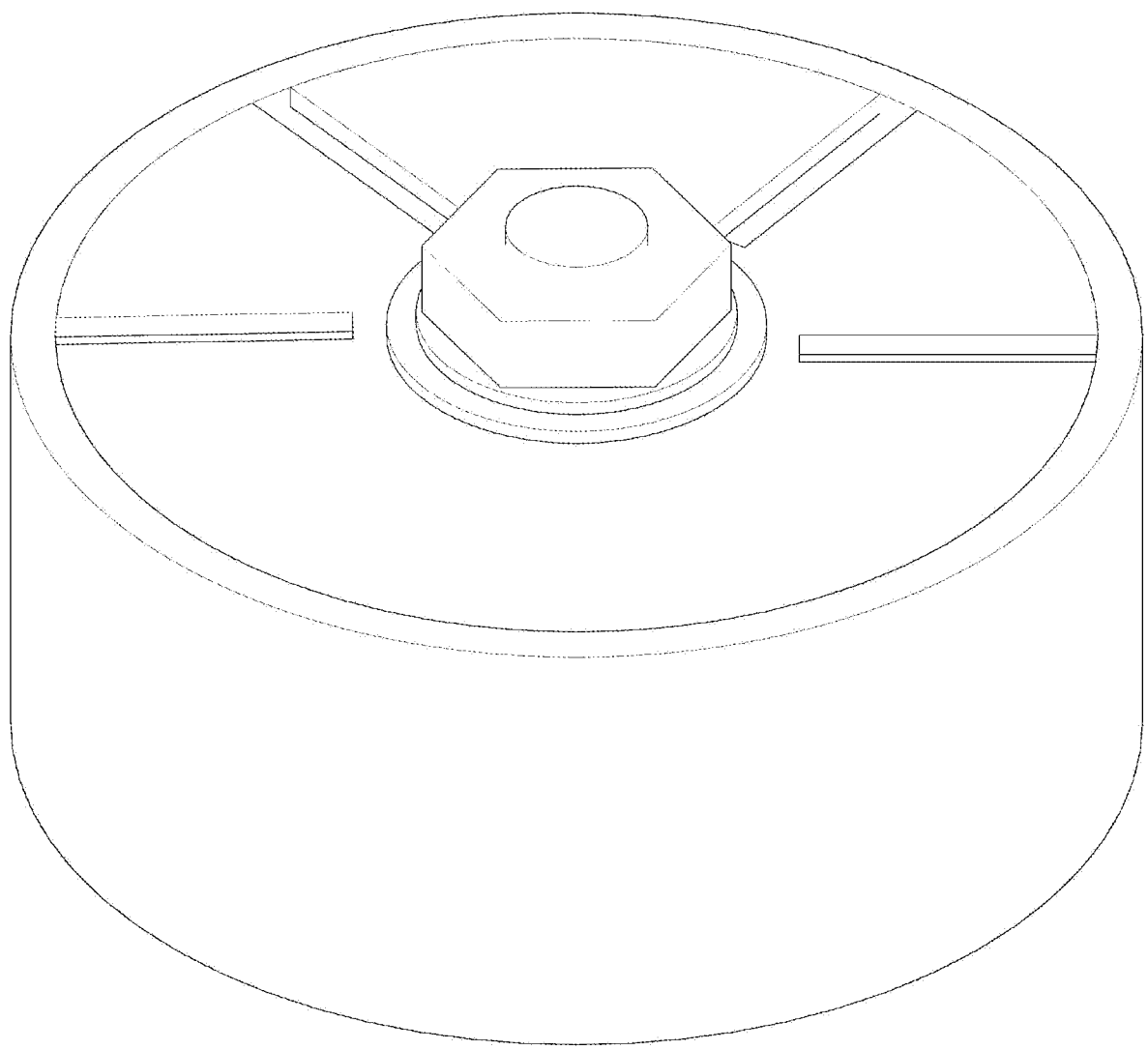
FIG. 6b depicts an assembled hub, registration caps, and bolt assembly.

FIGS. 6a and 6b show a perspective view of an exploded and an intact hub 1 and top and bottom registration caps 50, 51 and bolt assembly 67 which includes a bolt 61, nuts 62, and a plurality of washers 63.

If each individual joint connector 100 is placed on an independent XYZ cartesian plane such that each individual hub's 1 normal vector 2 represents the Z-direction in the plane, then each slot seam line or centerline 56, 57, in the upper or lower registration cap 50, 51, corresponds to the XY-direction of each wing pair 8 in relative space. Each of these seams is separated by corresponding angle 64. Similarly, the pitch or angle 23 of protrusion 19 of wing pair 8 correspond to the Z-direction of the joint connector 100 relative to its neighbor joint connectors 100.

Figure 7:
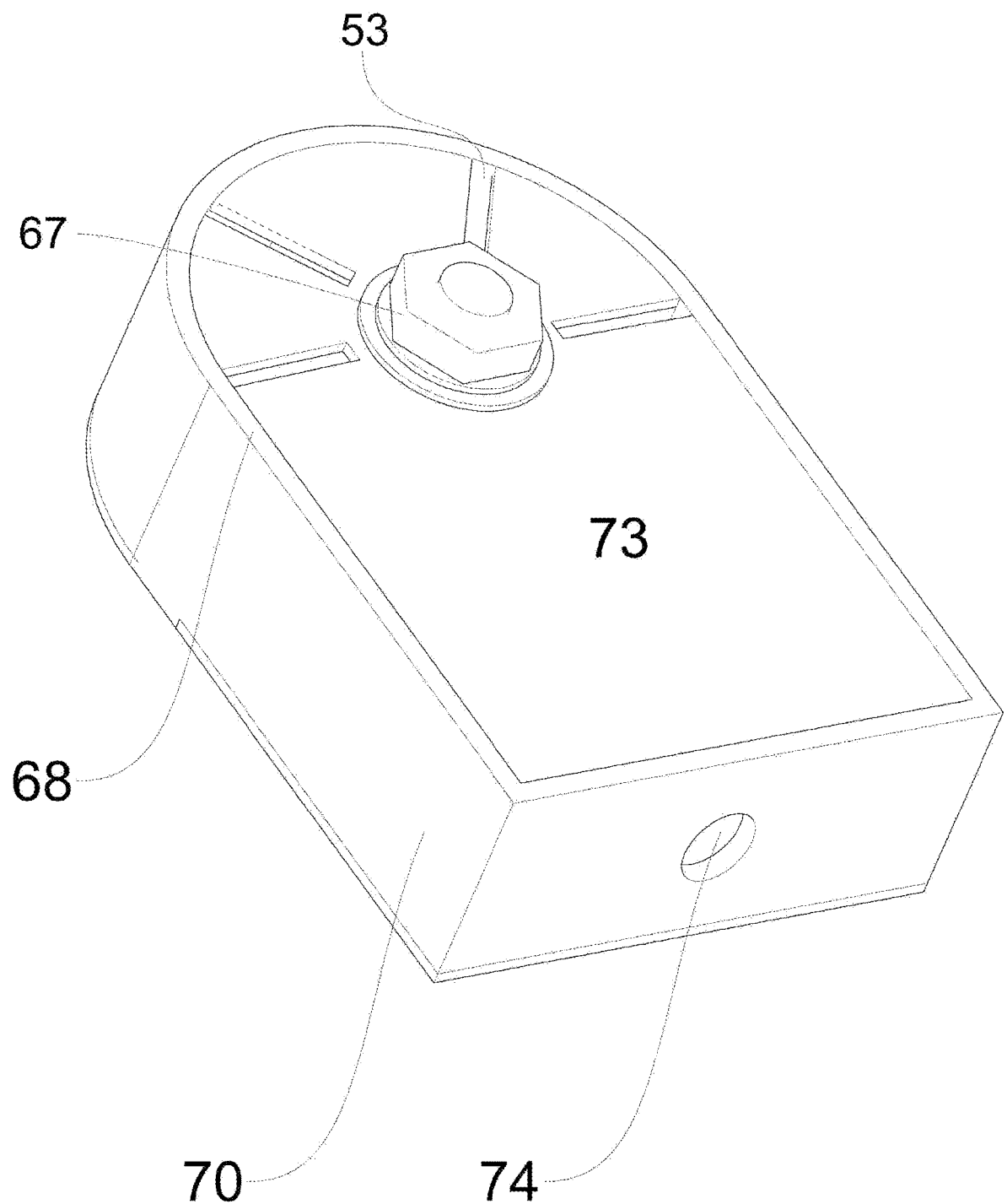
FIG. 7 depicts a modified hub, modified registration caps, and bolt assembly.

There will be two types of joint connectors 100, clothed joint connectors 100, an example of which is FIGS. 6a and 6b, and naked joint connectors 100, an example of which is FIG. 7. Some naked joint connectors 100 are intended to attach to the ground or another surface which will serve as an anchor point to the ground indirectly, for example, a wall. These naked joint connectors 100 will have modified hubs 70 and registration cap pairs 73. There will also be a flat section with one or more anchoring hole 74 in the hub 1 that can accept a lag bolt 61 or other method of securely affixing the joint connector to the ground or anchoring surface.

Figure 8:
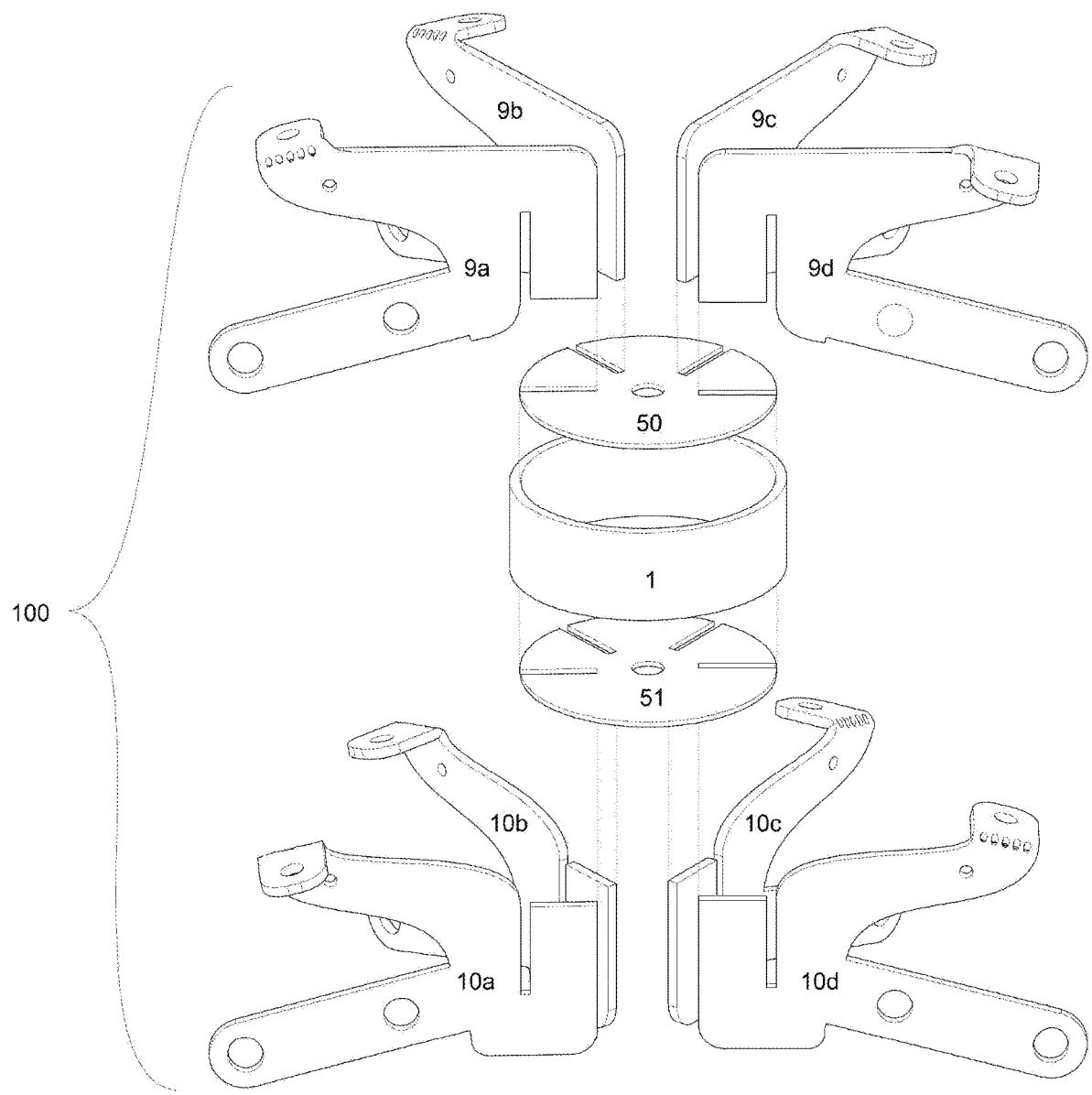
FIG. 8 depicts an exploded view of a hub, registration cap pair, and four wing pairs.

FIG. 8 shows an exploded view of a complete joint connector 100 having hub 1, top and bottom registration caps 50, 51, a plurality of upper and lower wings 9a-d, 10a-d, with tabs 26 folded into place at their perforation line 27. Upper wings 9a-d and lower wings 10a-d will likely have different pitches (23a and 23b) from each other, as dictated by the arrangement in space of the joint connectors 100 relative to their neighbors.

Figure 9:
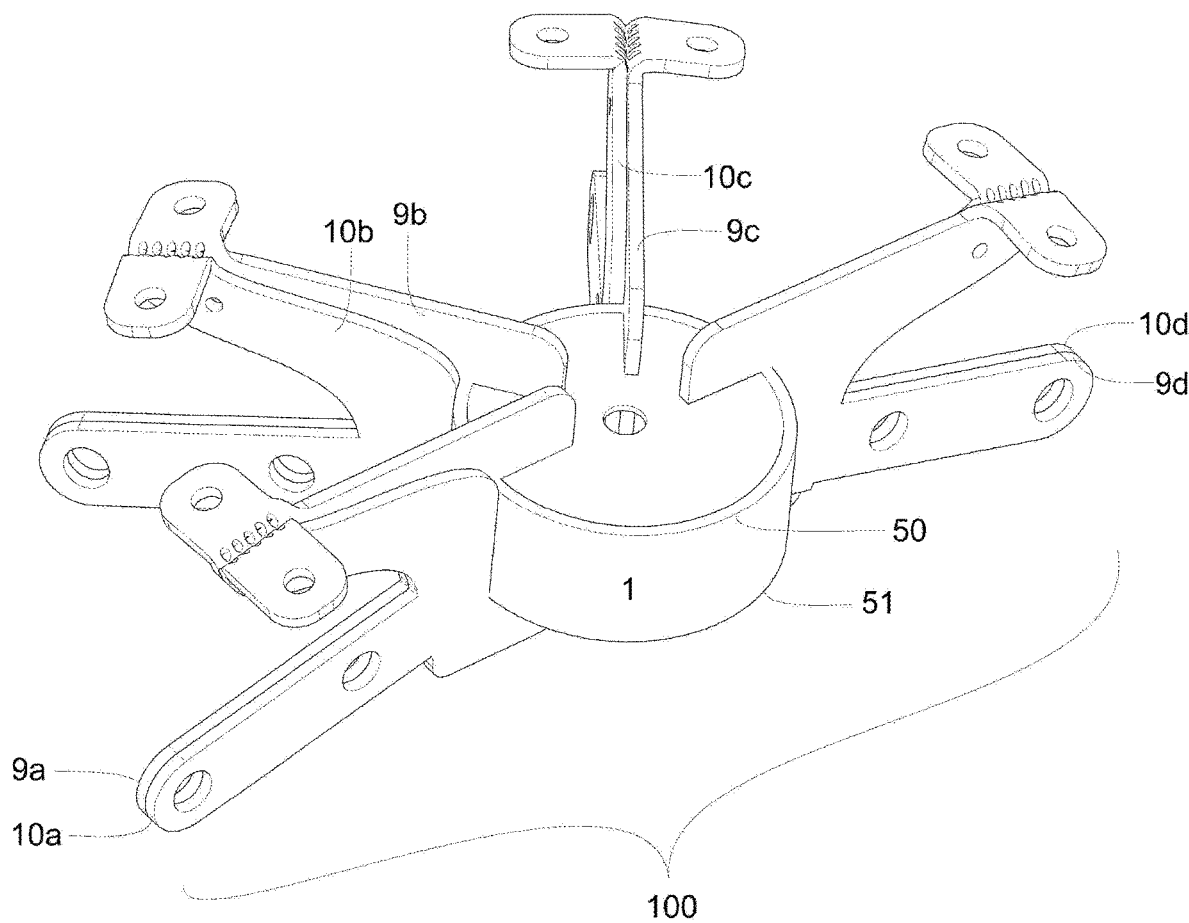
FIG. 9 depicts an assembled hub, registration cap pair, and four wing pairs.

FIG. 9 shows an assembled view of the same joint connector 100.

Figure 10:
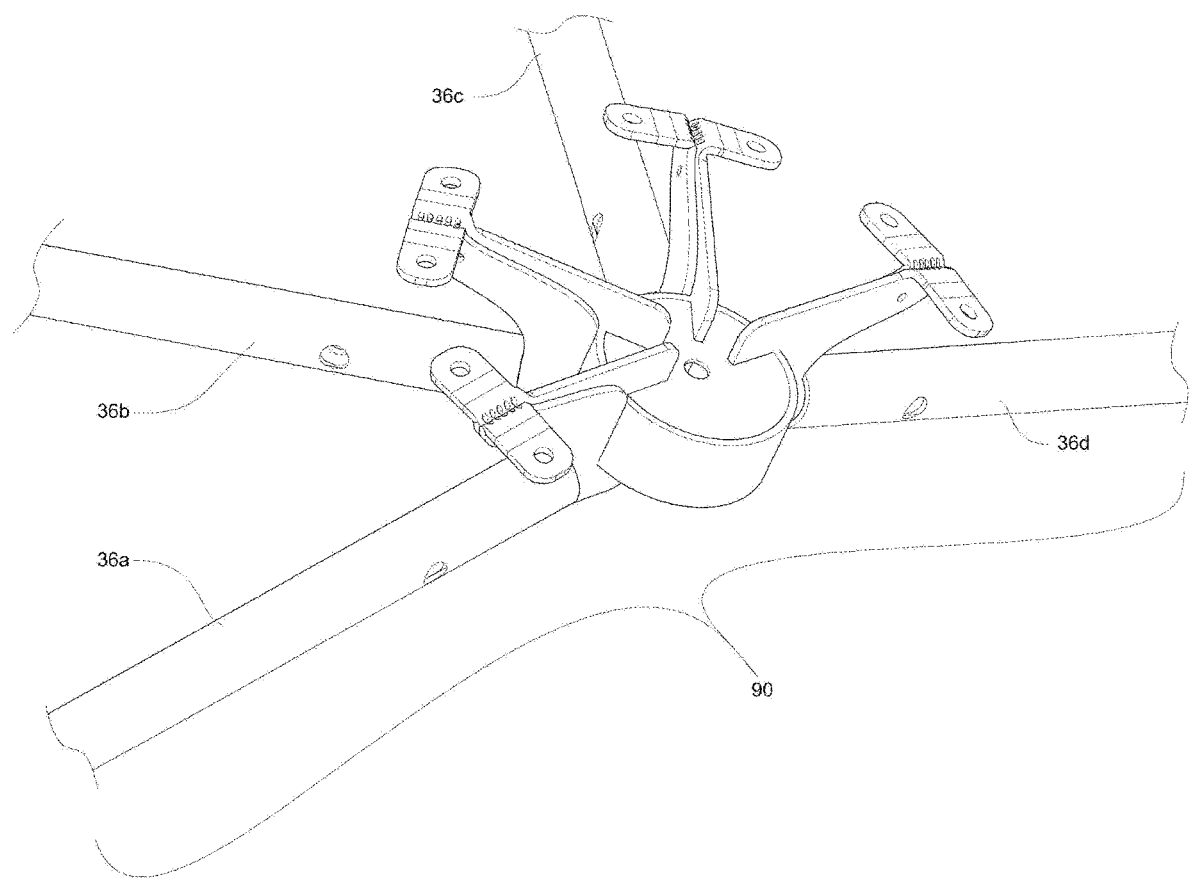
FIG. 10 depicts an assembled hub, registration cap pair, and four wing pairs with struts inserted over the wing pair protrusions.

FIG. 10 shows the strut network 36a-d attached to the complete joint connector 100. The length of each strut 36a-d is dependent on the way in which it will be assembled with respect to neighboring joint connectors 100.

Figure 11:
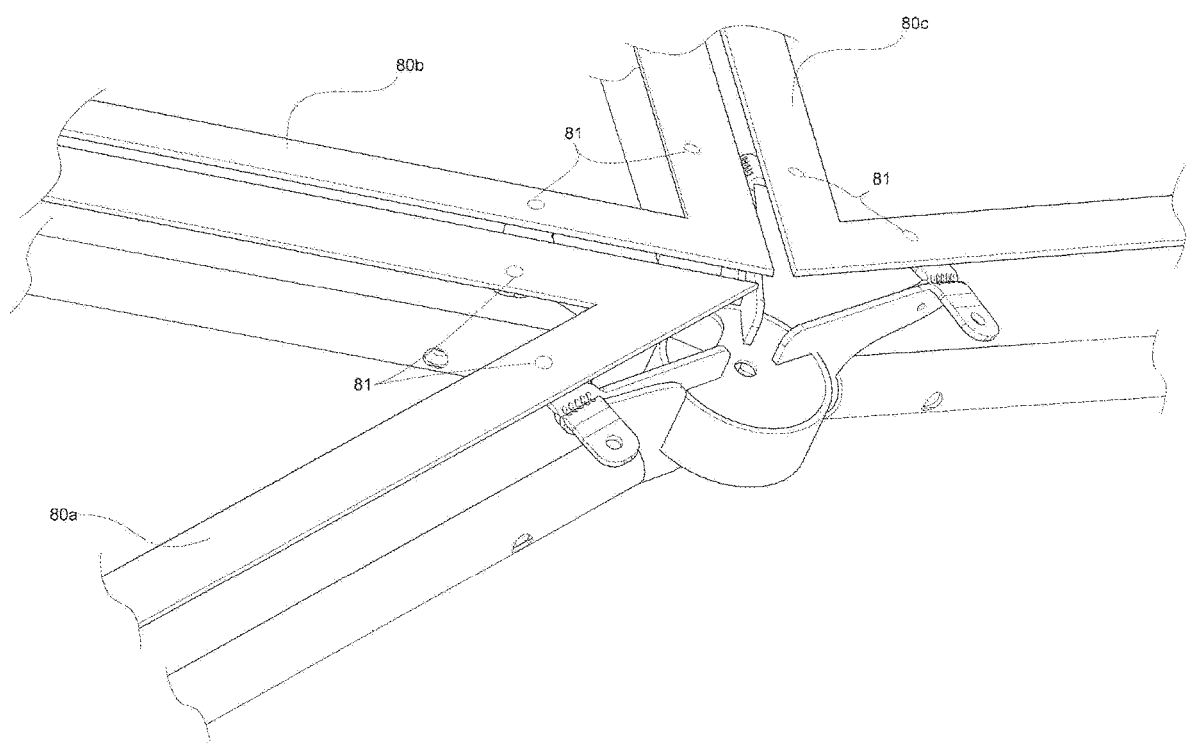
FIG. 11 depicts an assembled hub, registration cap pair, and four wing pairs with struts inserted over the wing pair protrusions with glazing frames attached to the tabs.
Figure 12:
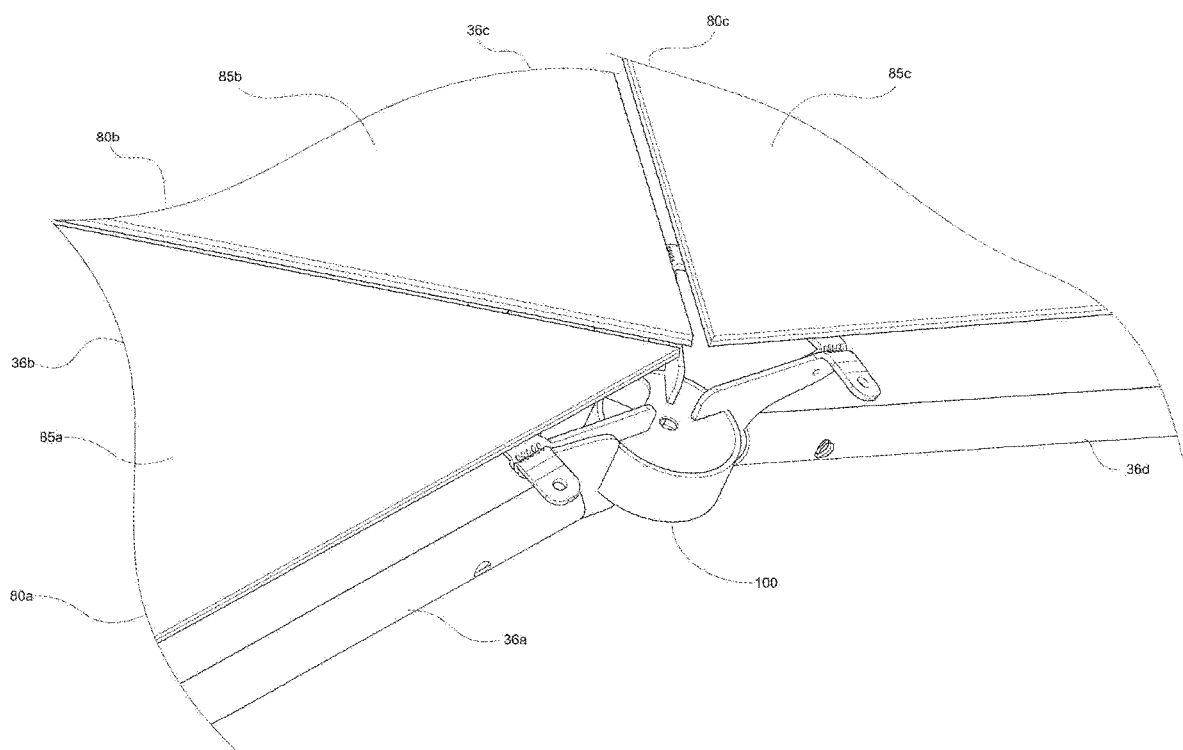
FIG. 12 depicts an assembled hub, registration cap pair, and four wing pairs with struts inserted over the wing pair protrusions with glazing frames attached to the tabs and with panels attached.

FIGS. 11 and 12 show sample sections of panel frames 80a-c and panels 85a-c connected to a single joint connector 100.

FIG. 11 shows the sample sections of panel frames 80a-c attached to the tabs 26 of the joint connector 100. The panel frames 80a-c have holes 81 which correspond to the holes 28 in the tabs 26. The panel frames 80a-c can be attached to the tabs 26 by bolt assemblies 67 or welding or other means.

The panel frame 80 will locate and hold securely a network of panels 85a-c (sample sections shown), typically glazing, as shown in FIG. 12.

Any gaps or troughs in the panel 85a-c seams can be filled with gasketing rubber or silicone caulk or other material to aid in thermal insulation and weatherproofing.

Figure 13:
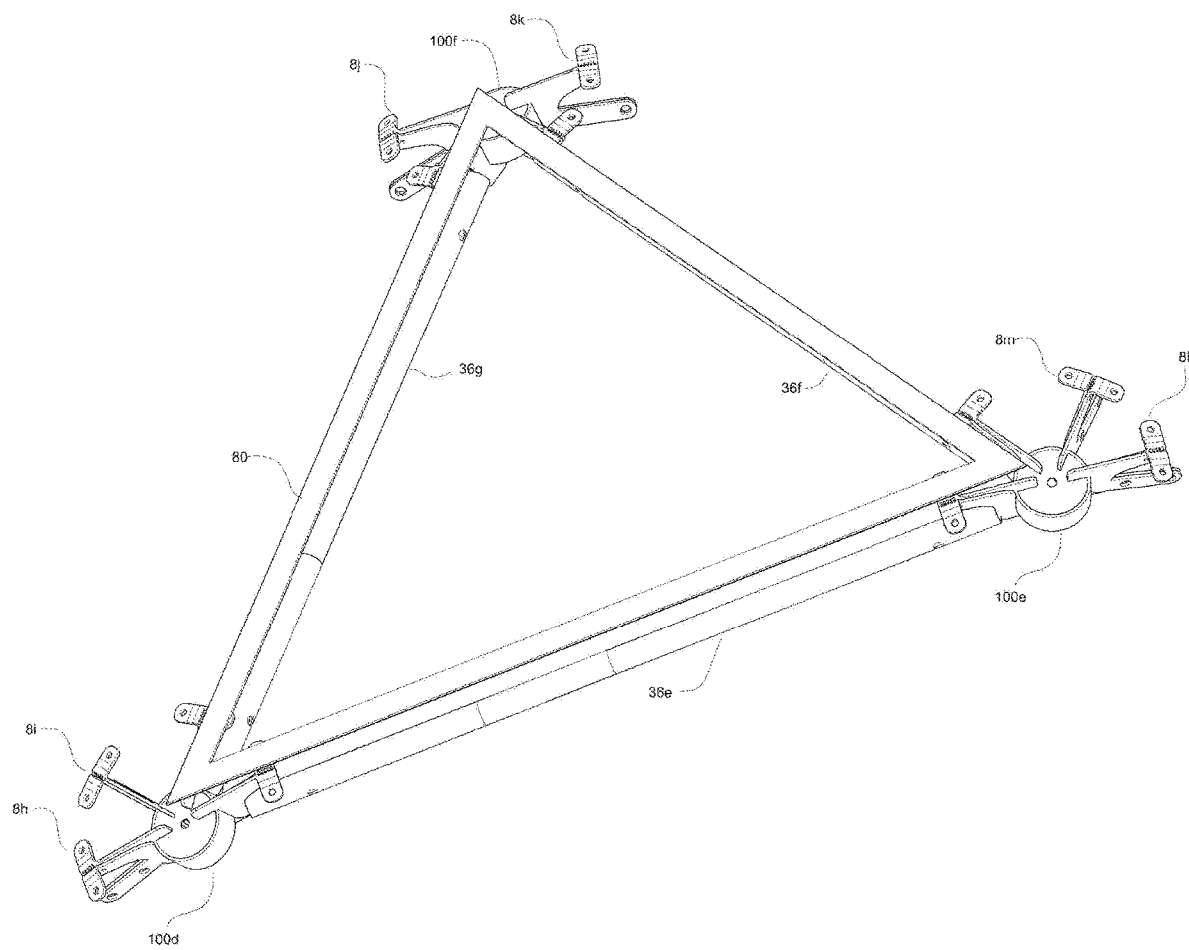
FIG. 13 depicts an assembled panel frame attached to three joint connectors.
Figure 14:
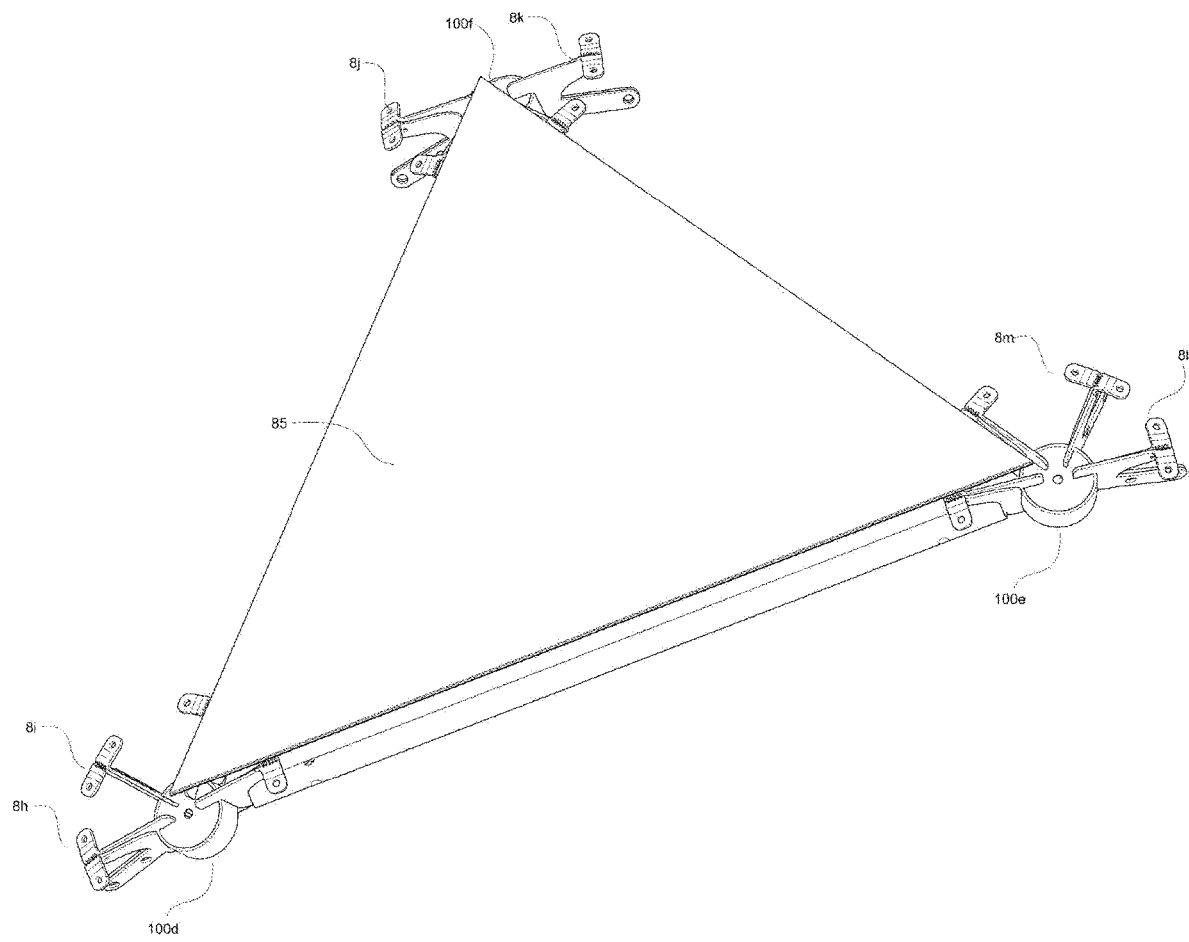
FIG. 14 depicts a panel attached to an assembled panel frame.

FIGS. 13 and 14 show a full panel frame 80 and full panel 85 connected by three neighboring joint connectors 100 and corresponding struts 36. These figures demonstrate how a network of joint connectors 100d-f connected by their appropriate network of strut 36, panel frames 80, and panels 85 can form a three-dimensional structure.

FIG. 13 shows three separate joint connectors 100d-f connected by struts 36 and the corresponding panel frame 80. Note that in this example, only one panel frame 80 is shown. The other wing pairs 8h-m point to where neighboring panel frames 80 and panels 85 could attach to their respective neighbors (not shown).

FIG. 14 shows the same setup as FIG. 13, with a panel 85 attached to the panel frame 80. In this way, three joint connectors 100d-f come together connected by struts 36 and a panel frame 80 can hold an appropriately sized panel 85, and together a network of these can form an enclosed structure (not shown).

One benefit of the present disclosure is that it provides for the ability of translating a three-dimensional faceted geometric network into a vertex-based relative XYZ coordinate system. It allows an assembly of parts also described in this disclosure to be manufactured and to be used to assemble this substructure frame (not shown) and panel frame 80 and panels 85 together as a gridshell structure (not shown).

As can be imagined, the joint connectors 100 of the present disclosure can be modified to achieve different shaped structures and building assemblies.

In one embodiment, the joint connector 100 has at least two wing pairs 8. In another embodiment, the number of wing pairs 8 is up to thirty six. In a preferred embodiment, the number of wing pairs 8 is between two and twenty four. In a more preferred embodiment, the number of wing pairs 8 is between three and seven.

The XY-coordinate angles 64 between the wing pairs 8 may range from 0.00 to 180.00 and the pitch 19 protruding from the wing pair 8 is in the range of −180.00 to 180.00 degrees relative to the normal vector 2 of the hub.

In use, the joint connectors 100 are connected by a strut 36 network to form a structurally sound substructural frame. A superstructural frame (the panel frame 80) may be offset from and connected to the substructural frame by way of wing pairs 8 of the joint connector 100. Glazing (not shown) may then be attached to the panel frame 80.

In one embodiment, a joint connector 100 includes a hub 1, which identifies or points towards the combined-normal-vector of the joint connector 100, and thus serves as the reference vector of the joint connector 100 to determine the geometric relationship of its parts to each neighboring joint connector's parts.

The joint connector 100 also includes an upper and lower registration cap 9, 10, attached above and below the hub 1. The joint connector 100 also includes at least two wing pairs 8 that mate face-to-face by sleeving on top of, and below the wall of the hub 1. The wing pairs 8 all have two parts which align: the protrusions 19 and the tabs 26.

The wing pair protrusions 19 are sleeved into their associated strut 36 and attached to the strut 36 to both prevent the wings pair 8 from separating and also prevent the strut 36 from slipping off. The joint connector 100 and struts 36 form the substructure 90.

Wing pair protrusions 19 will have their tabs 26 folded away from them at their perforation lines 27. In some cases, the wing pair tabs 26 will be folded identically, but in other cases, they may be folded differently for the upper and lower wing 9, 10, of wing pair 8. Importantly, the tabs 26 are folded such that both of tab's 26 planes are still parallel with the struts 36 that sleeve the particular wing pair's 8 protrusions 19. Thus the seam of the wing pair's 8 folded tabs 26 is inline with their associated strut 36, and they thus act as the edge where two neighboring panels 85 meet. The degree of each tab's 26 fold is determined by what is needed to attach to its respective panel frame 80 (superstructure), which is in-plane with the triangle or quadrilateral or other planar shape that it supports.

A plurality of glazing frames 80 together form the superstructure (not shown), which together with the substructure 90, as joined by the wing pairs 8, form a gridshell. In FIG. 12, joint connector 100 together with struts 36, panel frames 80 and panels 85 show a section of what this gridshell might look like.

The joint connector 100 is composed of various interlocking parts, which together can conform to almost any condition required of it to create, in aggregate with other joint connectors 100, structures of almost unlimited shape and size. This is because of the three different degrees of freedom provided by the joint connector 100. The joint connector 100 may be laser cut or water jet cut or any other type of machine cut to create flat interlocking parts in order to assemble a multi-panel faceted structure. Based on the geometry of the structure, the joint connector 100 will provide all of the interlocking parts required to assemble all of the joint connectors 100 to the struts 36 and panel frames 80, thereby creating a variety of different structures. The joint connector 100 will be useful in regular and semi-regular structures and for irregular structures. The joint connector 100 eliminates the need for making unique joint connectors 100 in the case of irregular structures.

EXAMPLES

Figure 15:
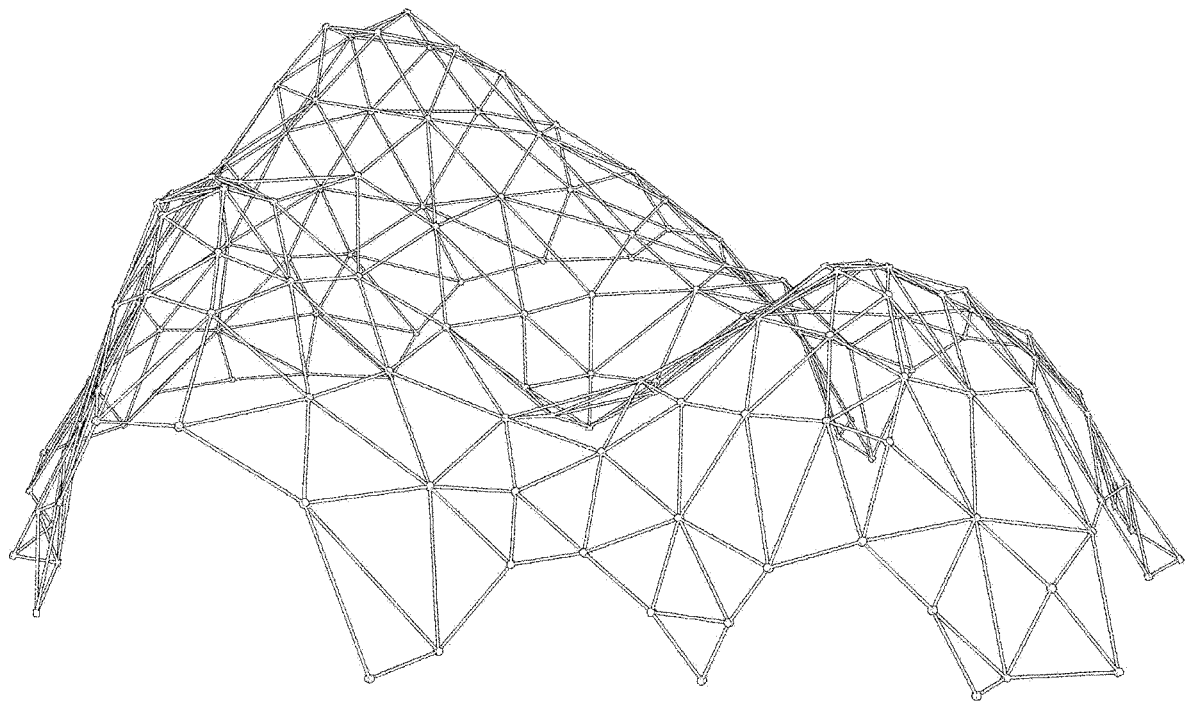
FIG. 15 depicts the joint connectors in use in an irregularly shaped structure.

FIG. 15 shows an example of a network of joint connectors and struts, forming a substructure capable of holding a panel frame and panel network above it.

It will be appreciated by those skilled in the art that while the joint connector has been described in detail herein, the invention is not necessarily so limited and other examples, embodiments, uses, modifications, and departures from the embodiments, examples, uses, and modifications may be made without departing from the process and all such embodiments are intended to be within the scope and spirit of the appended claims.

What is claimed:

1. A joint connector comprising:
   a hub;
   a top registration cap; having at least one rectangular slot
   a bottom registration cap having at least one rectangular slot;
   at least two lower wings arranged in at least one lower wing pair;
   at least two upper wings arranged in at least one upper wing pair;
   wherein the at least two lower wings and at least two upper wings each have a hub connection area having a rectangular slot;
   wherein the at least two lower wings and at least two upper wings further include a shoulder, a protrusion, a side, and a tab extending from the side;
   wherein the at least two lower wings and at least two upper wings further include a perforation line on the tab, wherein the perforation line on the tab is capable of being folded;
   wherein the top and bottom registration caps are connected to a top and bottom of the hub at their respective rectangular slots;
   wherein the at least one lower wing pair and at least one upper wing pair are connected to the top registration cap and bottom registration cap respectively at their respective rectangular slots;
   wherein there are at least two lower wing pairs and at least two upper wing pairs;
   wherein the angle between the at least two lower wing pairs and at least two upper wing pairs is in the range of 0 to 180 degrees;
   wherein the angle of the protrusion is in the range of −180.0 to 180.0; and
   wherein the at least two lower wings and at least two upper wings have a hole in each of their respective tabs.

2. The joint connector of claim 1, wherein the at least two lower wings and at least two upper wings have a hole in each of their respective protrusions.

3. The joint connector of claim 2, wherein the at least two lower wings and at least two upper wings have a hole in each of their respective sides.

4. The joint connector of claim 3, wherein the top registration cap and bottom registration cap each have a hole in the center.

5. The joint connector of claim 4, wherein the joint connector further includes a bolt assembly to connect the top registration cap to a top of the hub and the bottom registration cap to a bottom of the hub.

6. The joint connector of claim 5, wherein the bolt assembly further comprises:
   a bolt;
   a nut; and
   at least one washer.

* * * * *